(12) United States Patent
Chiarin et al.

(10) Patent No.: US 6,594,077 B2
(45) Date of Patent: Jul. 15, 2003

(54) SLIDE FOR THE MICROSCOPIC EXAMINATION OF BIOLOGICAL FLUIDS

(75) Inventors: Ulisse Chiarin, Arzergrande (IT); Roberto Sgaravatto, Arzergrande (IT)

(73) Assignee: Meus S.r.l. (IT)

(*) Notice: Subject to any disclaimer, the term of this patent is extended or adjusted under 35 U.S.C. 154(b) by 4 days.

(21) Appl. No.: 09/918,275

(22) Filed: Jul. 30, 2001

(65) Prior Publication Data

US 2002/0093735 A1 Jul. 18, 2002

(30) Foreign Application Priority Data

Jan. 12, 2001 (IT) .......................................... VI2001A14

(51) Int. Cl.⁷ .............................................. G02B 21/34
(52) U.S. Cl. ....................................... 359/397; 356/244
(58) Field of Search ................................. 359/396, 397, 359/398; 356/244, 246

(56) References Cited

U.S. PATENT DOCUMENTS 4,637,693 A * 1/1987 Mitchell ..................... 356/246
4,790,640 A * 12/1988 Nason ......................... 156/99

FOREIGN PATENT DOCUMENTS

EP 326349 A2 * 8/1989 ............ B23H/1/00

* cited by examiner

Primary Examiner—Cassandra Spyrou
Assistant Examiner—Lee Fineman
(74) Attorney, Agent, or Firm—Pennie & Edmonds, LLP

(57) ABSTRACT

A slide for use in microscopic examination of biological fluid is constituted by two plates of transparent material, one plate being a bottom and the other plate being a cover, the plates forming wells which are filled by capillarity with the biological fluid to be examined. A plurality of reliefs form a plurality of computation chambers in each well. The reliefs which define each computation chamber sectioned along a plane perpendicular to the bottom of the well have a shaped section along a profile assimilable to a polygon having at least one right angle.

12 Claims, 6 Drawing Sheets

SLIDE FOR THE MICROSCOPIC EXAMINATION OF BIOLOGICAL FLUIDS

FIELD OF THE INVENTION

This invention relates to slides for use in microscopic examination of biological fluid.

BACKGROUND OF THE PRIOR ART

It is known that plates, called slides, have been used in the microscopic examination of biological fluid, such as urine, blood, and spinal fluid, for the purpose of carrying out a computation of elements present in a predefined sample. The slides are constituted by two plates of transparent plastic material, one for a floor and one for a covering, which define a plurality of wells in their interiors. The wells are filled by capillarity with drops of the biological fluid which are deposited on the slide itself.

On the floor of each well are formed computation chambers, in each of which is contained an accurate volume of biological fluid to be examined. These computation chambers are obtained by means of reliefs which are formed from the floor of the well towards the covering or roof.

In reference to the trajectory of the reliefs it is possible to obtain quadrilateral or circular computation chambers, depending on whether the reliefs have a rectilinear direction so as to form grids or have a circular direction so as to form circles which are reciprocally separated. By way of example of the first type of computation chamber, the European Patent Publication No. 326,349 A2 describes a slide made of plastic material in which computation chambers in wells are defined by a grid pattern made up of symmetrical lines. The symmetrical lines have a width of between about 0.008 mm and 0.05 mm, and extend upwardly from the floor of the well preferably for 0.008 mm and the minimal area for the reading of each chamber has a floor of 0.111 mm.

Also by way of example, with respect to the second type of a computation chamber, the slides produced by the company Kima have reliefs of a width between 0.005 mm and 0.05 mm. The relief forms a circular computation chamber having as the floor a circle of internal diameter 0.376 mm.

The reliefs or grids define computation chambers, preferably arranged 3×3, and the total internal surface of all the chambers is 1 mm². In order to obtain reliefs of millesimal dimensions, the production of these types of slides from plastic material requires the use of molds provided with engraved marks and impressions which are of microscopic value, well defined, and made by means of special machines for the removal of chips, by electroerosion, or with other processes known in the art.

In fact, by means of constructions known up to the present, observations with an optical microscope for measuring small particles in a fluid sample are often inaccurate, because in conventional reliefs the optical lines which correspond respectively to the line of the vertex and to the line of the bottom of the relief are subject to confusion due to the inclination of the wall of the relief.

This fact causes an error in the reading or in the computation of small particles because it is difficult to examine the small particles which remain adhering to the inclined walls. There is also a discrepancy in reading the values of areas measured on the upper plane of the computation chamber (corresponding to the relief), and areas measured a the bottom of the computation chamber. This error is further increased due to the fact that it has heretofore been impossible to provide reliefs with inclined walls which are perfectly uniform along the entire computation chamber.

SUMMARY OF THE INVENTION

The present invention relates to slides in which computation chambers present in wells are defined by reliefs which protrude from the bottom of the chambers. The reliefs are preferably rectilinear or circular—a profile easily achievable with machines. The reliefs define precise lateral walls of the computation chamber so as to measure accurately the volume of the chamber.

The invention provides slides comprising reliefs defining computation chambers which are sectioned along a plane perpendicular to the bottom of the well. The relief has a section with a profile shaped as a polygon having at least one right angle. The right angle is defined by the bottom of the computation chamber and the internal lateral wall of the computation chamber.

The invention further provides that the lateral wall of the computation chamber has its upper extremity constituted by a corner which is a part of the polygon which defines the relief. The lateral wall has an internal angular opening of 90 degrees at the most and is rounded with a radius of curvature at the most 0.002 mm.

In operation, the preferred form of the reliefs has a rectangular trapezium or a rectangular triangle section. The embodiments essentially better define the separation between the area which constitutes the computation chamber and the surrounding area which separates reciprocally the plurality of the chambers.

BRIEF DESCRIPTION OF THE DRAWINGS

The characteristics of the invention will be better clarified by reference to a description of a possible embodiment. The embodiment is provided by way of illustration of a non-limiting example, as described in the figures, of which.

DETAILED DESCRIPTION OF THE INVENTION

Figure 1:
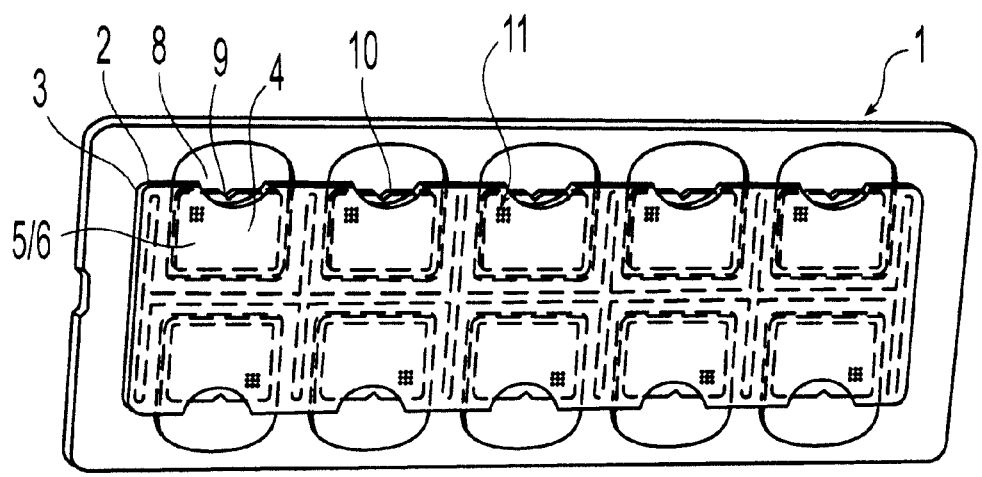
FIG. 1 shows a perspective view of the entire slide according to the present invention.
Figure 2:
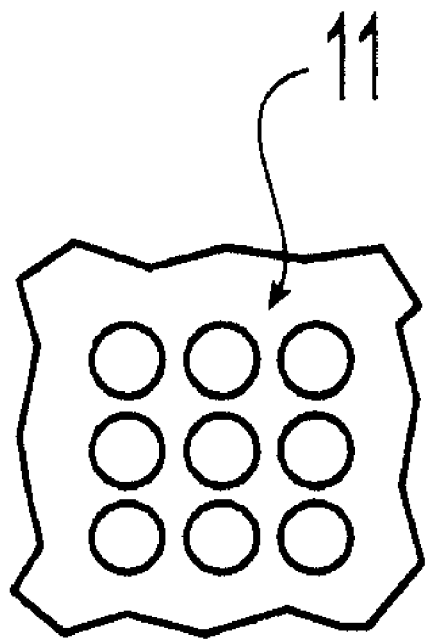
FIG. 2 shows a matrix of nine computation chambers, disposed 3×3.

As shown in FIG. 1, a slide (1) made of plastic material comprises a lower plate (2) and an upper plate (3), the lower plate being assembled with the upper plate (3) preferably by ultrasonic welding. After these two plates are assembled, they define wells (4), which are each constituted by a floor (5) which is a part of the lower plate perfectly planar and smooth, with a grade of roughness which should be the lowest possible and a roof (6) which is defined by the upper plate (3) with such characteristics of transparency to provide optimal microscopic observation.

Each well is filled with a drop of a sample of biological fluid which is deposited on a threshold (8) which is formed on the lower plate. The fluid penetrates into the well (4) by capillarity through an opening (9).

Figure 3A:
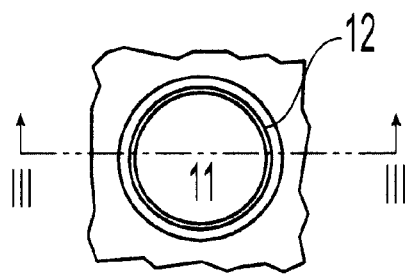
FIG. 3A shows a plan view of a computation chamber defined by a relief having a section in the shape of a rectangular trapezium.
Figure 3B:
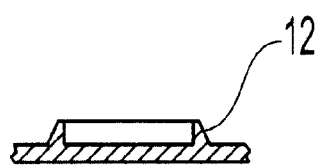
FIG. 3B is a cross-sectional view along line III—III of FIG. 3A of a computation chamber defined by a relief having a section in the shape of a rectangular trapezium.
Figure 3C:
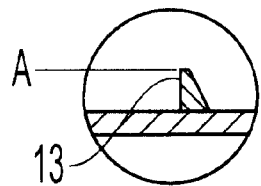
FIG. 3C is a detailed view of a computation chamber defined by a relief having a section in the shape of a rectangular trapezium.
Figure 4A:
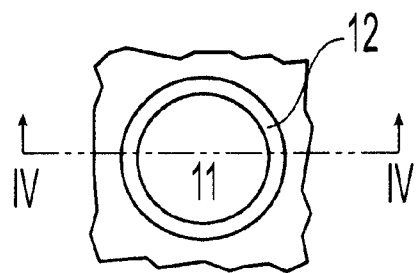
FIG. 4A shows a plan view of a computation chamber defined by a relief having a section in the shape of a rectangular trapezium.
Figure 4B:
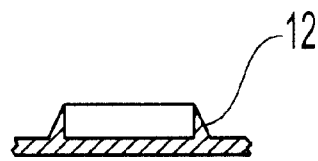
FIG. 4B is a cross-sectional view along line IV—IV of FIG. 4A of a computation chamber defined by a relief having a section in the shape of a right triangle.
Figure 4C:
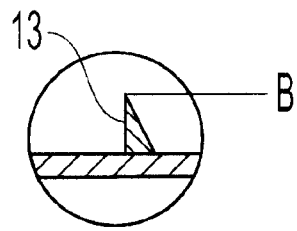
FIG. 4C is a detailed view of a computation chamber defined by a relief having a section in the shape of a right triangle.

In the described configuration, each well (4) has an area of about 66 $mm^2$ and contains a volume equal to 6.6 $mm^3$. At the bottom of each well (4) is present a matrix (10) constituted by nine computation chambers (11) disposed in series of 3×3. Each computation chamber (11) is constituted by a circle of internal diameter 0.376 mm. The chamber is delimited by a relief (12). Each relief is characterized in that it has a section with a profile shaped as a polygon. Such shape may be a rectangular (or right) trapezium, as shown in FIG. 3, or a right triangle, as shown in FIG. 4. The side of the right angle of the polygonal shape constitutes an internal vertical or lateral wall (13) of the chamber.

The relief of the present invention is preferably rectilinear or circular, which has a profile easily achievable with machines. Accordingly, the invention provides a relief defining a computation chamber which is sectioned along a plane perpendicular to the bottom of the well. The relief has a section of a polygon having at least one right angle. The right angle is defined by the floor of the chamber and the internal lateral wall of the chamber. The relief defines a precise lateral wall of the computation chamber so as to measure accurately the volume of the chamber.

In operation, the preferred form of the reliefs has a rectangular (or right) trapezium or a right triangle section. The embodiment essentially better defines the separation between the areas of the computation chamber and the surrounding area which separates reciprocally the plurality of the chambers.

Figure 5A:
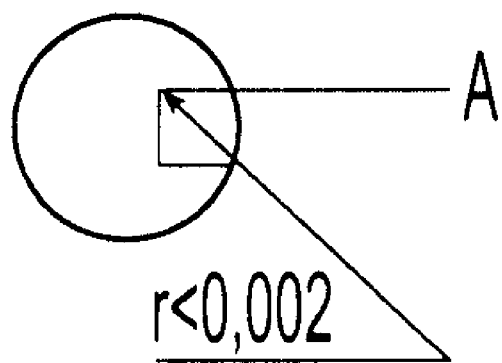
FIG. 5A shows a detailed view of the upper extremity of the internal lateral wall of the computation chamber of FIG. 3C.
Figure 5B:
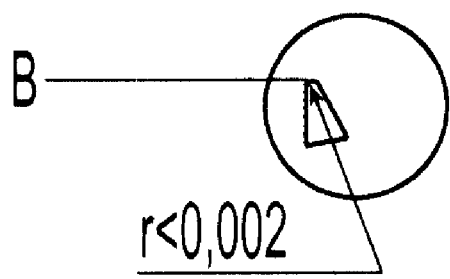
FIG. 5B shows a detailed view of the upper extremity of the internal lateral wall of the computation chamber of FIG. 4C.

Further, the invention provides that the lateral wall of the computation chamber has its upper extremity constituted by a corner which is a part of the polygon which defines the relief. The lateral wall has an internal angular opening of 90 degrees at the most and the apex is rounded with a radius of curvature at the most 0.002 mm, as shown in FIGS. 5A and 5B as references A and B, respectively.

Obviously some embodiments are different from the embodiment which has been described above, in forms, dimensions, the number of the wells, the number of computation chambers present in each well, or in the use of material, for instance, a material which is not plastic, such as glass, but technically equivalent may be used. Such modifications are also intended to fall within the scope of the appended claims.

What is claimed is:

1. A slide for use in microscopic examination of biological fluid for a computation of elements in a predefined sample, said slide comprising:

a first plate and a second plate of transparent material, said first plate forming a floor and said second plate forming a covering, said plates forming therebetween at least one well with a bottom; and a computation chamber formed on said bottom of said well and having a floor, said computation chamber being defined by a relief, said relief extending from said bottom of said well, and having a section with a profile shaped as a polygon with at least one right angle and a side defining an internal lateral wall of said computation chamber;

wherein:

the right angle is defined by said floor of said computation chamber and by said internal lateral wall of said computation chamber; and said relief extends circularly, whereby said computation chamber is constituted by a circle.

2. The slide according to claim 1, wherein said internal lateral wall of said computation chamber has its upper extremities constituted by a corner which is a part of said polygon shape of said relief, said polygon having an internal angular opening at the most 90 degrees and said corner is rounded up to a radius of curvature of at the most 0.002 mm.

3. A slide for use in microscopic examination of biological fluid for a computation of elements in a predefined sample, said slide comprising:

a first plate and a second plate of transparent material, said first plate forming a floor and said second plate forming a covering, said plates forming therebetween at least one well with a bottom; and a computation chamber formed on said bottom of said well and having a floor, said computation chamber being defined by a relief, said relief extending from said bottom of said well, and having a section with a profile shaped as a polygon with at least one right angle and a side defining an internal lateral wall of said computation chamber;

wherein:

the right angle is defined by said floor of said computation chamber and by said internal lateral wall of said computation chamber; and said relief has a section with a profile in the shape of a rectangular trapezium.

4. The slide according to claim 3, wherein said relief extends rectilinearly, whereby said computation chamber has a quadrilateral shape.

5. The slide according to claim 3, wherein said relief extends circularly, whereby said computation chamber is constituted by a circle.

6. A slide for use in microscopic examination of biological fluid for a computation of elements in a predefined sample, said slide comprising:

a first plate and a second plate of transparent material, said first plate forming a floor and said second plate forming a covering, said plates forming therebetween at least one well with a bottom; and a computation chamber formed on said bottom of said well and having a floor, said computation chamber being defined by a relief, said relief extending from said bottom of said well, and having a section with a profile shaped as a polygon with at least one right angle and a side defining an internal lateral wall of said computation chamber;

wherein:

the right angle is defined by said floor of said computation chamber and by said internal lateral wall of said computation chamber; and said relief has a section with a profile in the shape of a right triangle.

7. The slide according to claim 6, wherein said relief extends circularly, whereby said computation chamber is constituted by a circle.

8. A slide for use in microscopic examination of biological fluid, said slide comprising:
- a lower plate and an upper plate, said two plates being assembled by ultrasonic welding to define wells, said wells comprising a bottom which is a part of said lower plate and is plane and smooth and a roof defined by said upper plate with a transparency property capable of permitting optical microscopic observation, each well being adapted to being filled with a drop of biological fluid deposited on a threshold formed on said lower plate, said drop penetrating by capillarity through an opening to said bottom of each well; and
- a matrix present on the bottom of each well, said matrix comprising nine computation chambers arranged in 3×3 series, each computation chamber having a floor and being delimited by a circular relief, each relief defining each computation chamber having a section with a profile in the shape of a polygon and defining an internal lateral wall of each computation chamber at a right angle to the respective floor of each computation chamber.

9. The slide according to claim 8, wherein each said relief has a section with a profile of a rectangular trapezium in which the side of the right angle of the rectangular trapezium constitutes said internal lateral wall of each respective computation chamber.

10. The slide according to claim 8, wherein each said relief has a section with a profile of a right triangle in which the side of the right angle of the right triangle constitutes said internal lateral wall of each respective computation chamber.

11. The slide according to claim 9, wherein the top of said internal lateral wall is rounded with a radius of curvature of at the most 0.002 mm.

12. The slide according to claim 10, wherein the top of said internal lateral wall is rounded with a radius of curvature of at most 0.002 mm.

* * * * *